United States Patent [19]

Smith et al.

[11] Patent Number: 5,166,007

[45] Date of Patent: Nov. 24, 1992

[54] REPAIR COMPOSITIONS AND STRUCTURE

[76] Inventors: W. Novis Smith, 412 S. Perth St., Philadelphia, Pa. 19147; Mark Livesay, 1374 Merritt Dr., El Cajon, Calif. 92020

[21] Appl. No.: 757,690

[22] Filed: Sep. 11, 1991

[51] Int. Cl.$^5$ .............................. B32B 3/26; B32B 5/16; B41J 31/14

[52] U.S. Cl. .................................... 428/63; 428/251; 428/252; 428/273; 428/285; 428/286; 428/246; 428/290; 428/345; 427/140; 427/141; 427/142

[58] Field of Search .................. 428/63, 224, 225, 240, 428/241, 245, 246, 290; 427/140, 141, 142

[56] References Cited

U.S. PATENT DOCUMENTS 333,727  1/1886  Campbell ............................ 362/122
4,822,665  4/1989  Scholz et al. ...................... 428/290

OTHER PUBLICATIONS 1992 catalog, Flora Craft Corporation, pp. 10 and 11, 1 Longfellow Place, Ludington, Mich. 49431.

*Primary Examiner*—George F. Lesmes
*Assistant Examiner*—Kathryne Elaine Shelborne
*Attorney, Agent, or Firm*—John Lezdey

[57] ABSTRACT

The invention concerns a patch or repair assembly for repairing vehicles, installations and parts. The assembly comprises at least one photocurable prepreg fabric, a UV transparent release film on top of the fabric and a UV blocking film over the release film. There is also disclosed a method of repairing using the assembly of the invention.

18 Claims, 1 Drawing Sheet

REPAIR COMPOSITIONS AND STRUCTURE

FIELD OF THE INVENTION

The present invention relates to a method, composition and structure for repairing vehicles, parts, installations, and the like. More particularly, the invention provides a means for quickly repairing or sealing vehicles, metallic surfaces, tanks, pipes and parts utilizing photocurable resins.

BACKGROUND OF THE INVENTION

A number of devices are known to plug apertures in tanks, pipes, automobiles, water-going vessels and the like. However, the prior art devices in many cases cannot be used in connection with hard to bond and complex surfaces.

A common practice of repairing holes in panels is to form a tapered recess in the composite material around the hole. Disk-shaped layers of structural fiber cloth of different diameters are set into the recess. The fibers of each layer are oriented at a different angle to the fibers of the adjoining layer. The layers are then secured in place by the use of high strength adhesive. A problem with these adhesives is that they require a long cure time. Also, this method of repair requires a highly trained technician and the repaired area relies totally on the adhesives to transfer the design load across the repair. A similar technique is disclosed by U.S. Pat. No. 4,544,036, granted Nov. 19, 1985, to Cosby M. Newsom. Other repair techniques, known in the patent literature are disclosed by U.S. Pat. No. 4,517,038, granted May 14, 1985 to Robert W. Miller, and U.S. Pat. No. 4,560,428, granted Dec. 24, 1985 to George O. Sherrick and Joseph R. Rosenthal.

U.S. Pat. No. 3,470,048 to Jones discloses a method of patching car bodies with an adhesive repair patch in combination with a plastic filler material containing a catalyst.

U.S. Pat. No. 4,486,254 to Zinimon discloses a heat activated patch or repair composition for metal objects. The patch or repair composition is heat activated by heating from the opposite surface to a temperature of from about 250° to 500° F.

U.S. Pat. No. 4,916,880 to Westerman discloses the combination of shaped inserts and adhesives for repairing a hole in a panel of composite materials.

European Patent Application No. 0,016,248 to Dainippon Ink & Chemical, discloses a process for producing prepregs which can be used in the present invention.

It is to be understood that the term "fabric" as used herein is intended to include a knitted cloth, for example, plain jersey knit, interlock, ribbed, cross float jersey knit or weft knit, and the like, or woven into a fabric, for example of plain weave, satin weave, twill weave, basket weave, and the like. The woven fabric may combine the various fibers of the present invention, the fabric may also be in the form of a non-woven material such as a mat, fluff or batting of fibers such as described above. The fabric may include a wool-like fluffy material produced from high modulus fibers. The substrate in the form of a batting or wool-like fluff may be prepared by conventional needle-punching means.

The term "installation" as used herein is meant to relate to machinery, building structures, tanks, and the like which are metallic or plastic.

The term "parts" includes the components of the installation or vehicles as well as tools.

The term "photocurable" includes means curable upon exposure to UV radiation as well as electron beam radiation.

SUMMARY OF THE INVENTION

In accordance with the invention there is provided a patch or repair assembly for repairing vehicles, installations, parts, and the like which comprises at least one photocurable prepreg fabric, a UV transparent release film on top of the prepreg fabric, and a UV blocking film at least covering the UV transparent release film.

Advantageously, the UV blocking film comprises a UV blocking pouch or container in which the patch is kept until it is ready for use. A second UV blocking film may be placed over the UV transparent release film for ease in handling and placing the patch before activation.

A multiplicity of photocurable prepreg fabrics can be utilized depending upon the type of repair required. At least one of the prepreg fabrics can be a heat curable prepreg fabric.

Depending upon the type of damage area, the assembly can be used in conjunction with a photocurable molding. Preferably, the molding contains a thickening agent and/or reinforcing materials.

In accordance with one embodiment of the invention there is provided a repair path system which can be utilized to repair tanks and similar containers which hold liquids and/or low pressure gases. The patch system utilizes a fiberglass fabric or mat which is impregnated with a photocurable unsaturated polyester, acrylic or vinyl ester resin. A light curable vinyl novolac resin is one of the preferred resins for forming the prepreg. The patch can be held in place with a plastic and/or metal fastener. Alternatively, the patch can be held in place by adhesive means. Also, when partially cured, the prepreg is sufficiently tacky to adhere to surfaces without adhesives.

In accordance with another embodiment of the invention there is provided a method of repairing vehicles, installations, parts and the like utilizing the assembly of the invention.

Advantageously, the method includes the step of filling a hole in a damaged surface with a photocurable molding prior to application of the assembly.

It is therefore an object of the invention to provide a photocurable patch or repair assembly which can repair damaged surfaces and parts.

It is a further object of the invention to provide a patch for repairing damaged vehicles or parts quickly and economically.

It is a yet still further object of the invention to provide a means for repairing damaged surfaces under a liquid.

It is yet another object of the invention to provide a method of repairing surfaces that can be performed quickly and economically.

Other objects and aspects of the invention will be more quickly understood and better described in view of the following specification taken in conjunction with the appended drawings, wherein:

Figure 1:
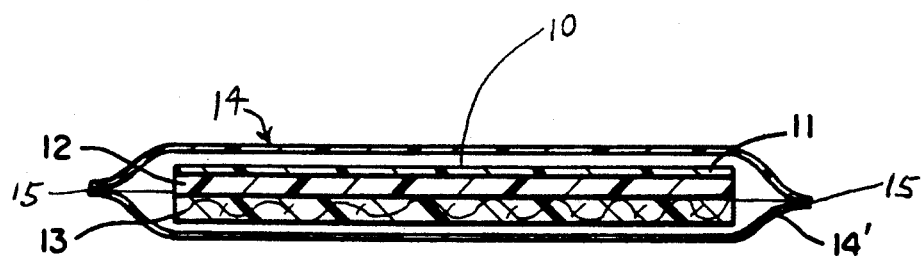
FIG. 1 shows a cross-sectional view of a patch of the invention in a protective pouch.

Although specific terms are used in the following description for the sake of clarity, these terms are intended to refer only to the particular structure of the invention selected for illustration in the drawings and are not intended to define or limit the scope of the invention.

As seen in FIG. 1, the invention provides a basic patch 10 which can be used in repairing a damaged surface.

Patch 10 comprises a photocurable resin impregnated (prepreg) fabric 13 having a non-radiation blocking transparent film 12 covering the fabric 13 and an optional radiation blocking layer 11 over the film 12. The patch 10 is placed within a UV blocking container or pouch 14 to prevent curing of the prepreg fabric 13 prior to use. Optionally, the pouch 14 may have a separable layer 14' which peels away at the seams 15 so as to expose the bottom of the patch 10. The top portion of the pouch 14 can be used to cover the patch 10 upon activation of the photocurable resin and suppress any fumes, particularly styrenic fumes, from entering the atmosphere. Preferably, the top portion of the pouch has a removable UV blocking layer.

The patch 10 can be used by partially curing the bottom of the patch so that it becomes tacky and adheres to the surface being repaired. The radiation blocking layer 11, if present, is removed so as to expose the patch 10 to UV radiation for curing. The transparent layer 12 permits handling of the patch 10 so as to tightly press the patch 10 against the surface while curing.

Figure 2:
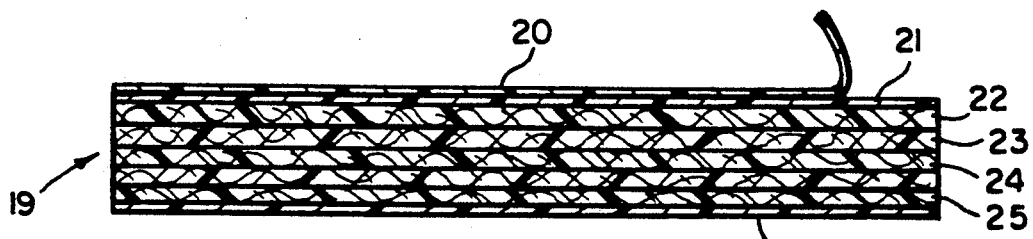
FIG. 2 is a cross-sectional side view of a multi-layer patch of the invention.

FIG. 2 shows a multi-layered patch 19 containing a plurality of prepreg layers. The patch 19 is provided with a peelable top layer 20 comprising a radiation blocking or opaque sheet material. The radiation blocking sheet 20 may be embossed so as to be readily peelable. The film 21 may form part of a pouch enclosing the patch. Under the sheet 20 is a transparent film 21 which permits the passage of UV radiation. The sheet 20 covers a first prepreg fabric 22 comprising a photocurable resin impregnated fabric 22. Preferably, fabric 22 comprises a woven fabric. A further fabric layer 23 can comprises a photocurable prepreg fabric layer or a heat activated prepreg fabric layer. There is generally enough heat transmitted upon activation of the photocurable layer 22 to permit initiation of the cure of an adjacent prepreg layer.

The patch 19 can comprise one or more other photocurable prepreg fabric layers 24. The photocurable resin employed in the layers 24 can be similarly cured as fabric layer 22 depending upon the use of the patch and the time required before final cure is effected. The different prepreg layers can contain resins which are curable at different rates. The different prepreg layers can be used to provide different functions, such as, adhesion, stiffness, high impact, etc.

The bottom layer 25 need not be a prepreg layer. It can be used to form a base for the a patch to adhere. Layer 25 can contain a bottom layer 26 of a contact adhesive to effect initial bonding to the surface. However, if layer 25 is a prepreg layer, then the bottom layer 26 can either be an adhesive layer or a release film. The bottom layer 26 is preferably a pressure adhesive layer when the patch is used under water or under pressure to obtain rapid adhesion.

The patch 19 can be formed by separately applying each of the layers 22, 23, 24 and 25 that can be provided with the UV blocking layer 20 and a transparent layer 21 However, all of the layers may be placed on the damaged surface simultaneously. It has been found to be advantageous to bind layers 22, 23, 24 and 25 together, such as by needle punching, so as to more easily stack and align the layers upon use.

Figure 3:
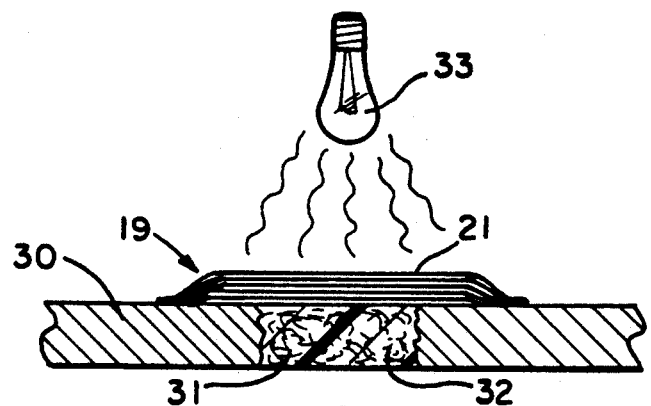
FIG. 3 is a cross-sectional view of a metal part which is repaired with an assembly of the invention in combination with a filler molding.

FIG. 3 illustrates a further embodiment of the invention where a metal surface 30 having a hole is first plugged with a molding 31 of photocurable resin. The molding 31 may contain reinforcing material and/or a thickening agent 32. The molding 31 is used to smooth out the hole before covering the damaged area with a patch 19 and curing the patch 19 with a source 33 of UV light.

A preferred prepreg fabric of the invention can be formed by impregnating the fabric with a composition comprising a mixture of (a) one or more ethylenically unsaturated copolymerizable polyesters, vinyl or acrylic ester (b) one or more ethylenically unsaturated copolymerizable monomeric compounds, (c) an inhibitor and (d) a UV sensitizer, with or without paraffins, thermally decomposable initiators, fillers, reinforcing agents, lubricants, inert solvents, shrinkage-reducing additives and/or other assistants usable in unsaturated polyesters. Advantageously, the UV sensitizer consists of one or more acylphosphine oxide compounds of the formula:

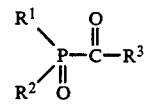

wherein $R^1$ is straight-chain or branched alkyl of 1 to 6 carbon atoms, cyclohexyl, cyclopentyl, aryl which is unsubstituted or substituted by halogen, alkyl or alkoxy, or a S-containing or N-containing five-membered or six-membered heterocyclic radical $R^2$ has one of the meanings of $R^1$ (but $R^1$ and $R^2$ may be identical or different), or is alkoxy of 1 to 6 carbon atoms, aryloxy or aralkoxy, or $R^1$ and $R^2$ together form a ring, and $R^3$ is straight-chain or branched alkyl of 2 to 18 carbon atoms, a cycloaliphatic radical of 3 to 10 carbon atoms, phenyl, naphthyl or a S-, O- or N-containing five-membered or six-membered heterocyclic radical, and may contain additional substituents, or is the group

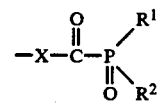

wherein $R^1$ and $R^2$ have the above meanings an X is phenylene or an aliphatic or cycloaliphatic divalent radical of 2 to 6 carbon atoms, and one or more of the radicals $R^1$ to $R^2$ may be olefinically unsaturated. Such UV sensitizers are disclosed in U.S. Pat. No. 4,265,723, which is herein incorporated by reference.

A particularly advantageous patch or repair assembly comprises at least one photocurable prepreg fabric, a UV transparent release film on both sides of the fabric, and;

at least UV blocking layer over at least one of the UV transparent release films.

The UV blocking layer can form part of a pouch or container for protecting the prepreg fabric prior to use or can be in the form of a film and a separate protective pouch or container.

The prepreg is formed with a photocurable resin containing about 5 to 25% of a monomer for reducing the amount of volatiles emitted during curing. The monomers utilized are preferably selected from the group consisting of vinyl toluene, divinyl toluene, tert-butylstyrene, hydroxyalkyl acrylate, hydroxyalkyl methacrylate, 1,4-butanediol diacrylate, 1,4-butanediol dimethacrylate, polyacrylate an polymethacrylate esters.

A Similarly advantageous results are also obtained on UV curing of kneadable molding compositions which can contain thickness and/or fillers.

Preferred UV sensitizers are those acylphosphine oxide compounds of the formula I where $R^3$ is cycloalkyl, naphthyl or a S-, N- or O-containing five-membered or six-membered heterocyclic radical which contains substituents A and B at least in the two ortho-positions to the carbonyl group, A and B, which are identical or different, being alkyl, cycloalkyl, aryl, alkoxy, thioalkyl, carbalkoxy, cyano or halogen.

The expression "contains substituents A and B in the two ortho-positions to the carbonyl group" means that the substituents A and B are bonded to the two carbon atoms, capable of substitution, which are adjacent to the point of attachment of the carbonyl group. This means, for example, that the α-naphthyl radical contains substituents A and B at least in the 2- and 8-positionings.

Such UV sensitizers, especially the particularly preferred 2,4,6-trimethylbenzoyldiphenylphosphine oxide, surpass in their reactivity all conventional photoinitiators for unsaturated polyester resins. This high reactivity results in a high exothermicity on curing laminates. Hence, the curing can be carried out with lamps of lower energy emission than hitherto. For example, it is possible to dispense with expensive high-pressure mercury vapor lamps and instead to use simpler low-pressure lamps, for example conventional fluorescent tubes.

The pouch of the invention can comprise any flexible opaque container. Preferably a flexible metal, that is, an aluminum pouch or an opaque plastic pouch is utilized. When the pouch is evacinated prior to sealing, the prepreg of the assembly have a longer shelf life.

The fabrics of the invention are comprised of fibers which can at least partially transmit UV light so as to initiate curing of the resin. The fabrics can in whole or in part comprise high modulus fibers and/or glass fibers. Although, in some cases where there is utilized an adhering fabric layer adjacent a damaged surface it is composed of a high modulus fiber such as aromatic polytetrafluoethylene, and the like.

S or E glass fabrics have been found to be particularly advantageous because of their transparency to UV light and their strength.

In the production of the prepreg, the amount of the composition composed of the unsaturated polyester, the unsaturated monomer and the polyisocyanate compound to be impregnated in the fabric is 35 to 85% of the volume of the resulting prepreg. The amount of the composition impregnated, however, cannot be straightforwardly determined because the density of the fabric differs with its type. For example, when the fabric is made of glass fibers, the amount of the composition impregnated is generally 25 to 70% by composition. In the case of a reinforcing material composed of fabric, the amount of the resin composition impregnated is generally 40 to 80% by weight based on the total amount of the fabric and the composition. In the case of a fabric composed of a metallic and glass fibers, the amount of the resin composition impregnated is 0 to 60% by weight based on the total of polyamide fibers, the amount of the resin composition impregnated is generally 45 to 80% by weight based on the total amount of the composition.

The unsaturated polyester used in the invention can be prepared in any convenient manner and is generally composed for one or more aliphatic and/or cycloaliphatic, mono-, di and/or polyvalent alcohols and one or more monovalent carboxylic acids and/or esters thereof. As examples of suitable alcohols may be alcohols and one or more monovalent carboxylic acids and/or esters thereof. As examples of suitable alcohols may be mentioned benzyl alcohol, ethylene glycol, propylene glycol, neopentyl glycol, hexanediol, dimethylol cyclohexane, 2,2-bis-(4-hydroxycyclohexyl)propane, 2,2-bis-(p-phenyleneoxyethanol)-propane, 2,2-bis-(p-phenyleneoxypropanol-2)-propane, diethylene glycol, glycerol, trimethylol ethane, trimethylol propane, pentaerythritol and/or dipentaerythritol. Instead of, or besides the alcohol compound(s) one or more epoxy compounds may be used, for instance ethylene oxide, propylene oxide, epoxy propanol and isodecanoic glycidyl ester. As examples of suitable di- or polyvalent carboxylic acids may be mentioned maleic acid, fumaric acid, itaconic acid, citraconic acid, malonic acid, succinic acid, glutaric acid, adipic acid, azelaic acid, succinic acid, glutaric acid, adipic acid, azelaic acid, sebacic acid, tetrahydrophthalic acid, hexahydrophthalic acid, dichlorophthalic acid, isophthalic acid, terephthalic acid and/or trimellitic acid. The carboxylic acid also may be used in the form of an anhydride should be employed besides isophthalic acid and/or orthophthalic acid. Optionally, the polyester resin may contain saturated or unsaturated monocarboxylic acids such as synthetic and/or natural fatty acids having 2 to 36 carbon atoms or esters prepared from these carboxylic acids and polyvalent alcohols such as glycerol. As examples of suitable monocarboxylic acids may be mentioned fatty acid precondensates having 5 to 10 carbon atoms, heptanoic acid, pelargonic acids, isononanoic acid, lauric acid, stearic acid, oleic acid, linoleic acid, linolenic acid, cerotic acid, benzoic acid, tert. butylbenzoic acid, acrylic acid and/or methacrylic acid.

The polyester resin may be prepared in any convenient manner, for instance by the melting process, in which reaction of the components takes place with evaporation of the water evolved in the reaction. Alternatively, however, use may be made of the solvent process, in which the water is removed azeotropically with for instance an organic solvent such as toluene or xylene, after which generally the volatile constituents are to the desired extent removed in vacuo.

As ethylenically unsaturated monomer any usual monomer may be employed. As examples of suitable monomers may be mentioned styrene, α-methyl styrene, vinyl toluene, divinyl benzene, diallyl phthalate and acrylic or methacrylic (hydroxy)esters of alcohols having 1 to 12 carbon atoms such as methanol, ethanol, propanol, butanol, ethylene glycol, propylene glycol, neopentyl glycol, butanediol, hexanediol, polyethylene glycol, glycerol, trimethylol ethane, trimethylol propane and pentaerythritol. It is preferred that styrene should be used. Also suitable are mixtures of monomeric compounds, more particularly mixtures of styrene and other monomers. The monomeric compound is usually present in the composition in an amount of 2 to 55% by weight, based on the polyester composition.

It has been found that vinyl novolac resins which have the following characteristics cure very fast and have enhanced properties including high temperature (>300° F.) deflection.

a. The novolac has a functionality greater than 1.9.

c. The vinyl novolac is made under the mildest conditions in order to keep the color as light a possible (<3 Gardener color).

d. The monomer is a styrene, acrylate or vinyl toluene in the range of 25 to 45% by weight.

Although many of the styrene containing vinyl ester and unsaturated polyester resins photocure rapidly in the presence of the phosphine oxide photoinitiator, there are a number of instances where even faster cure rates are desired.

It has also been found that acrylic and methacrylic monomers when added to a commercial resin in 5 to 25% amounts increase the cure rate significantly. The cure time can be cut by a third to a half with the addition of these selected acrylic monomers. The acrylic monomers must either have a hydroxyl group or have a functionality of two or more, preferably three or more.

These new resins cure rapidly, retain the physical properties of the original resin, and are a lower cost system than a 100% acrylic system.

The preferred configuration of the patch consists of a resin impregnated stack of fiberglass fabrics consisting of a bottom layer of mat followed by woven roving (24 oz) layer, then another layer of mat and finally a top layer of woven roving. The fiberglass stack is partially or totally stitched together to hold together during impregnation so that the layers do not slide around during impregnation. The total impregnated patch has a styrene, vinyl toluene (solvent) or acrylate ester resistant release film on the top and bottom. Covering the patch is a final layer of transparent UV blocking film (preferably amber or red) which permits working the patch with curing. This patch can be sealed in a aluminized or opaque plastic bag or pouch.

Preferably, the resin consists of a unsaturated polyester or vinyl ester resin with a styrene, acrylate or vinyl toluene monomer. In one preferred embodiment of the monomer content is held between 10% and 15% to minimize the amount of volatiles given off during curing. This is important if the patch or the fabrication of a part with this prepreg is performed inside a vehicle or room. In addition, the use of vinyl toluene or other higher boiling monomer (less volatile) instead of styrene further reduces the volatile emissions from the patch. We have found a particularly attractive combination of vinyl toluene and hydroxyalkyl acrylates and methacrylates which promotes rapid curing and enhanced bonding. The use of the monomers is necessary in this system because the polymerization or cure rate decreases below 10% total monomers. The preferred resin is an acrylated bisphenol A diepoxide or an acrylated novolac triepoxide with 10% vinyl toluene and 10% hydroxypropyl acrylate. The glass fabric stack is impregnated with 30%-75% resin depending on the specific application. The preferred amount for field repair of FRP vehicle components is 50%.

About 1 to 2% 1,6-hexane diisocyanate is added to the resin just prior to impregnation into the glass. After impregnation the resin thickens enough not to run out of the glass fabric due to the small amount of cross linking caused by the diisocyanate. This thickening will occur over a period of 24 hours at room temperature. It can be accelerated to 15-30 minutes by heating in an oven.

Prepregs which are formed with other than photocurable resins can be made with polyurethanes, epoxies, thermoplastics or phenolics which are known in the art.

The same resin composition utilized in forming the prepregs can be used to form the photocurable molding composition which is utilized as a plug for holes, cracks, or the like in a damaged surface being repaired. The molding composition can be made with suitable reinforcing materials and/or thickeners.

The reinforcing materials can be for instance, glass fibers, carbon fibers, high modulus fibers, metals and the like.

Examples of suitable thickeners are those based on alkaline earth metal oxides and hydroxides, e.g. calcium oxide, calcium hydroxide, magnesium hydroxide and, preferably, magnesium oxide, and mixtures of these oxides and/or hydroxides. These compounds may also be partly replaced by zinc oxide.

The content of thickeners in the polyester and vinyl ester molding compositions according to the invention is in general from 0.5 to 5, preferably from 1 to 3% by weight, based on the mixture.

In accordance with another embodiment of the invention there is provided a method of repairing vehicles, installions and parts having a damaged area comprising the steps of:

applying the patch or repair assembly of the invention to the damaged area, removing the UV blocking film, and subjecting said patch or repair assembly to UV light or sunlight.

In the event that the damaged area contains a hole, it is advantageous to first treat the damaged area with a photocurable resin composition or putty, preferably one which is reinforced with particles or fibers. The composition or putty is used to smooth out the surface and improve adhesion.

The method of the invention can also be performed by the steps of:

A. applying to the damaged area a first fabric comprising fibers selected from the group consisting of glass, a thermoplastic ionomer, polyethylene and polyamide. This first fabric can have an adhesive layer which is applied to the damaged area, B. applying over the first fabric at least one photocurable prepreg fabric, and C. photocuring said prepreg fabric.

In this case a multiplicity of prepreg fabrics can be applied over the first fabric and each prepreg fabric is photocured prior to applying additional prepreg fabric layers.

Alternatively, a fiber reinforced photocurable resin having a thickening agent is applied to the damaged area and photocured prior to applying the first fabric.

EXAMPLES

Preparation of Prepregs

A 1 g. of 1,6-hexanediisocyanate was added to 99 g. Derakane (DOW) 411-45 vinyl ester resin and mixed well. The resin was then impregnated into a glass mat and allowed to stand at room temperature. The resin had thickened sufficiently in the two hours that it no longer would flow out of the mat when it was held vertically and flexed. No further thickening occurred after 48 hours and prepreg glass mat was still tacky and flexible.

If the impregnated mat was heated to 120° F. for 30 minutes instead of held at room temperature, the resin thickened and was totally satisfactory. No further change occurred on standing 48 hours.

B. 1 g. LF-168 (a modified MDI diisocyanate ) was added to Derakane 411-45 and mixed well. The resin was then impregnated into a woven glass fabric and allowed to stand at room temperature. The same satisfactory result with respect to thickening as in Example A was obtained whether letting it stand for 2 hours or by heating for 30 minutes at 120° F.

C. 3 g. 1,6-hexanediisocyanate was added to 97 g. Silmar S4A (orthophthalate unsaturated polyester resin) and mixed well. The resin was then impregnated into a fiberglass mat and allowed to stand. After two hours at room temperature, the resin had thickened satisfactorily to prevent the flow of the resin our to the glass mat, yet remain tacky and flexible. The same result could be obtained by heating the freshly impregnated glass mat at 120° F. for 30 minutes.

What is claimed is:

1. A patch or repair assembly for quickly repairing vehicles, installations and parts which comprises:
   at least one photocurable tacky and flexible prepreg non-woven fabric; or
   at least one photocurable tacky and flexible prepreg woven fabric
   a UV transparent release film on top of said prepreg fabric, and
   a UV blocking film at least covering said UV transparent release film, said prepreg fabrics being impregnated with an acrylate novolac triepoxide having a functionality greater than 1.9.

2. The patch or repair assembly of claim 1 comprising a multiplicity of photocurable non-woven prepreg fabrics.

3. The patch or repair assembly of claim 2 wherein said prepreg fabrics are stitched to each other.

4. The patch or repair assembly of claim 1 wherein said at least one prepreg fabric comprises a transparent fiber selected from the group consisting of ceramic glass, quartz, polyamide, polybenzimidazole, polyethylene and an ionomer.

5. The patch or repair assembly of claim 1 wherein said UV transparent release film is polyvinyl alcohol.

6. The patch or resin assembly of claim 1 wherein said at least one prepreg fabric is impregnated with an acrylated novolac triepoxide with about 10% by weight of vinyl toluene and about 10% by weight of hydroxyl propyl acrylate or methacrylate.

7. The patch or resin assembly of claim 1 wherein said at least one prepreg fabric is impregnated with about 30 to 75% by weight of said photocurable resin.

8. The patch or resin assembly of claim 1 wherein said at least one prepreg fabric includes about 0.2 to 5% by weight of a thicknening agent.

9. The patch or resin assembly of claim 8 wherein said thickening agent is a di- or polyisocyanate.

10. The patch or resin assembly of claim 9 wherein said thickening agent is 1,6-hexane diisocyanate.

11. The patch or resin assembly of claim 9 wherein said thickening agent contains reinforcing agents.

12. The patch or resin assembly of claim 1 wherein each of said prepreg fabrics contains a photoinitiator.

13. The patch or resin assembly of claim 12 wherein said photoinitiator is an acylphosphine oxide.

14. The patch or resin assembly of claim 1 including a UV transparent release film on the bottom of said at least one prepreg fabric.

15. The patch or resin assembly of claim 1 wherein said U.V. blocking film comprises a UV protective container enclosing said patch or resin assembly.

16. The patch or resin assembly of claim 1 including at least one transparent UV blocking film.

17. The patch or resin assembly of claim 1 including at least one heat activated prepreg fabric.

18. The patch or resin assembly of claim 1 comprising a layer of a non-woven fabric comprising fibers selected from the group consisting of thermoplastic ionomer fibers, polyethylene fibers and aromatic polyamide fibers, and said layer having an adhesive layer for placement against said vehicle, installation or part.

* * * * *